(12) United States Patent
Klock et al.

(10) Patent No.: US 7,057,723 B2
(45) Date of Patent: Jun. 6, 2006

(54) OPTICAL SENSOR DEVICE AND METHOD FOR SPECTRAL ANALYSIS

(75) Inventors: Hansjorg Klock, Rubigen (CH);
Robert Jones, Cambridge (GB);
Michael Stuart Hazell, Cambridge (GB)

(73) Assignee: De la rue International Limited, Hampshire (GB)

( * ) Notice: Subject to any disclaimer, the term of this patent is extended or adjusted under 35 U.S.C. 154(b) by 175 days.

(21) Appl. No.: 10/433,859

(22) PCT Filed: Dec. 18, 2001

(86) PCT No.: PCT/GB01/05630

§ 371 (c)(1),
(2), (4) Date: Sep. 24, 2003

(87) PCT Pub. No.: WO02/50783

PCT Pub. Date: Jun. 27, 2002

(65) Prior Publication Data
US 2004/0061855 A1    Apr. 1, 2004

(30) Foreign Application Priority Data
Dec. 21, 2000    (EP) .................................. 00311560

(51) Int. Cl.
*G01J 3/28* (2006.01)
*G06K 9/74* (2006.01)
(52) U.S. Cl. ......................................... 356/328; 356/71
(58) Field of Classification Search .................. 356/71, 356/326–328; 283/85, 91; 382/135
See application file for complete search history.

(56) References Cited

U.S. PATENT DOCUMENTS

| | | | |
|---|---|---|---|
| 4,494,872 A | 1/1985 | Busch | |
| 5,064,290 A * | 11/1991 | McMurtry et al. | 356/499 |
| 5,329,353 A * | 7/1994 | Ichimura et al. | 356/328 |
| 5,498,879 A | 3/1996 | De Man | |
| 5,724,135 A * | 3/1998 | Bernhardt | 356/328 |
| 5,739,915 A | 4/1998 | Gau et al. | |
| 6,061,121 A | 5/2000 | Holl et al. | |
| 6,552,788 B1 * | 4/2003 | Castle | 356/326 |
| 2003/0048442 A1 * | 3/2003 | Xiao | 356/328 |

FOREIGN PATENT DOCUMENTS

| | | |
|---|---|---|
| DE | 195 23 140 A1 | 1/1997 |
| JP | 06-241897 | 9/1994 |

OTHER PUBLICATIONS

Machler et al., "MCS Multichannel Spectrometer", Zeiss Information, vol. 30, No. 100, pp. 16–19, 1990.

* cited by examiner

Primary Examiner—Gregory J. Toatley, Jr.
Assistant Examiner—Gordon J. Stock
(74) Attorney, Agent, or Firm—Oliff & Berridge, PLC

(57) ABSTRACT

An optical detection device for validating bank notes has several input apertures, an imagine device (12), a diffraction grating (15.1, 15.2, 15.3) associated with each input aperture (11.1, 11.2, 11.3) and a detection array (17). The diffraction grating (15.1, 15.2, 15.3) is rotated at angle of e.g. 45 degrees relative to the orientation of the linear detection array (17). This arrangement enables the spectra of multiple points to be measured simultaneously. The angle of rotation, the pitch of the apertures (11.1, 11.2, 11.3) and a pitch of the diffraction grating (15.1, 15.2, 15.3) are selected in such a way that the spectra of said multiple points are contiguously mapped onto the detection array (17) having a single linear array of color sensitive detection pixels. The axis of the linear array is offset with respect to an optical axis (7) of the optical detection device.

17 Claims, 1 Drawing Sheet

OPTICAL SENSOR DEVICE AND METHOD FOR SPECTRAL ANALYSIS

BACKGROUND

The invention relates to an optical detection device comprising at least one input aperture, an imaging device, at least one diffraction grating associated with the at least one input aperture and a linear detection array. The invention is also directed to a device for validating bank notes and to a method for the spectral analysis of an area of detection of an object.

Bank note validation (verification or authentication) is usually based, at least to some extent, on an optical detection method (see e.g. U.S. Pat. No. 5,607,040, EP 0 935 223). It is known to perform the verification by comparing a detected pattern with reference patterns (see e.g. EP-A-0947964).

Optical spectroscopy is well known in industrial laboratories and on production lines for process monitoring. In such applications spectrometers measure the optical spectrum in a given area of the object to be analyzed. Generally speaking, there are two ways to do that:

Scanning the spectrum in narrow bands by a single detector or measuring several spectral components simultaneously by a linear array detector.

Imaging spectrographs are already available on the market. An example of such a device is described in OLE, June 1994 pp. 33. This known device is a combination of a spectral analyzer and a CCD camera. Light enters through a slit at the front end of the spectral analyzer. It is then split up into its spectral components by a transmission grating and focussed on a two-dimensional CCD-detector (which is part of a conventional CCD camera). The transmission grating is sandwiched between two dispersing prisms (a construction that is known as PGP: "Prism-Grating-Prism").

The spectrometers known so far are well suited for production monitoring in industrial processes where plenty of space is available. However, they cannot be readily reduced in size and hence the known construction is not suited for integrated technical solutions.

SUMMARY OF THE INVENTION

It is an object of the invention to provide an optical sensor device based on spectral analysis. In particular it is an object to provide a device that can be applied to multiple points (and even single point) detection in a mechanically integrated space-economic construction.

In accordance with the present invention, an optical detection device in particular for spectroscopic measurements comprises at least one input aperture, an imaging device, at least one diffraction grating associated with the at least one input aperture and a linear detection array, and is characterized in that the grating lines of the diffraction grating extend at an acute angle relative to the longitudinal axis of the linear detection array.

By the fact that the angle of inclination is more than 0° and less than 90° there is a component of the direction of the spatial spectral dispersion which is parallel to the detection line, while at the same time it is possible to have arranged the spectra of several points side by side substantially without an overlap of the diffraction patterns. It is therefore possible to simultaneously analyze the spectra of a multiplicity of points on a detection line. Such a sensor device is particularly well suited for bank note validation. However, there are many other fields of application e.g. clinical in vivo analysis, safety equipment, monitoring of industrial manufacturing, sorting of objects etc. In some of the applications, optical fibre or lightguide linkage between the object and the optical detection device may be used to enable remote spectroscopic measurement.

According to a preferred embodiment there are several slit-type input apertures and corresponding diffraction gratings arranged along the direction of the detection line. Each slit-type aperture defines a "point" for which the spectrum is measured. (A point may have any appropriate size, e.g. several square millimeter.) The spectra of all points are determined in parallel.

For the validation of bank notes the line of detection is a straight line transverse to the direction in which the bank notes are fed. In addition, the length of the detection line corresponds to the full width of the transport path. This means that the bank note passing the sensor array device can be completely scanned.

It is to be mentioned that it is not compulsory to have slit-type input apertures. Circular, oval, rectangular or square forms are acceptable too. It is also possible to choose a detection line that is not straight. The input to the spectral sensor may be provided by a fiber bundle that brings any geometric distribution of "points" on one row. The sensor device may even comprise several lines of detection and as a consequence several linear detection arrays There are several parameters that can be varied to get the desired device geometry: The angle of inclination, the pitch of the apertures and the frequency (or the pitch) of the diffraction grating. According to a particularly preferred embodiment these parameters are chosen in such a way that spectra of the "points" are contiguously mapped on the detection array.

If only a part of the spectra is to be analysed, only said part has to be mapped contiguously.

The angle of inclination is preferably 45° Values close to 45° have similar advantages. It is possible to reach a spectral resolution of typically between 8 and 64 spectral components for each point. Depending on the requirements of the particular application of the spectrometer lower or higher spectral resolutions may be implemented. For a given detection array (which is characterized by the size and distance of the sensor pixels) there is a trade-off between spatial and spectral resolution. The higher the spectral resolution, the lower the spatial resolution and vice versa.

The detection array may be a single linear array of light sensitive detection pixels (integrated on a semiconductor chip e.g. in silicon or germanium/indium compounds). Preferably the linear array (i.e. the line of the detection sensors) is laterally offset with respect to an optical axis of the spectrometer. The optical axis is defined by the imaging device. Generally speaking, the input aperture and the diffraction grating are aligned with respect to the optical axis and the optical axis has a direction that is preferably perpendicular to the surface of the object to be analyzed.

The offset is such that the detection array covers the first order diffractions of all "points" to be analyzed simultaneously. Depending on the intensity directed to the different diffraction orders, it may also be possible to detect the spectral components of higher order diffractions.

It is an advantage if the diffraction grating is a transmission grating that has a preferential direction. A blaze grating e.g. concentrates the diffraction energy in the first order diffraction. Generally speaking, it is preferred to maximize power diffraction into an order intercepted by the linear detection array. The invention is not limited to such gratings but transmission gratings are preferred to reflection gratings.

The imaging device is e.g. a lens array that allows imaging a continuous strip-like detection area. It is well known that GRIN lens arrays (GRIN=graded index) known as Selfoc Lens Arrays (SLA) exhibit the desired behavior. However, depending on the purposes and needs of the selected field of application the spectrometer may be implemented with other imaging elements.

For scanning objects with a fine surface structure it is often required to have some antialiasing means to avoid undesired fluctuations. In connection with the sensor device of the invention it is particularly advantageous to arrange a cylinder lens in front of the input apertures. Said lens may be implemented by means of a long rod extending along the whole length of the detection line. The anti-aliasing takes place in one direction (i.e. in the direction of the detection line). In the other direction (i.e. transverse to the detection line) image is focussed. When the object is moving during a measuring cycle (as it is the case in high speed bank note validation) this automatically leads to an anti-aliasing in the transport direction.

Whether or not it is advisable to use anti-aliasing means depends on the optical structure (texture) of the object and the dimension of the input aperture. It is of course also possible to use other anti-aliasing means.

In order to have sufficient light in the selected order of diffraction it is important to have a good and concentrated illumination of the area ("points") to be analyzed. The invention therefore also proposes illumination means arranged to provide a narrow but long (i.e. stripe-like or line-like) illuminated area on the object (e.g. bank note).

When using fiber bundles to map a two-dimensionally extended area into a detection line it may of course be better to have means for illuminating e.g. a circular or other type of area (depending on the field of application).

For validating bank notes it is preferred to have illumination means with continuous broad band spectrum in the visible and infrared range (400 nm up to 2000 nm). As a matter of fact, the quality of the spectroscopic measurement depends on the quality of the illumination spectrum. Depending on the specific application it may be enough to have an illumination in the ultraviolet range (e.g. when using fluorescent effects) or only in the visible range.

The illumination can be combined from different light sources. The illuminator may comprise a plurality of sources and an imaging device for imaging the light of the sources to the stripe-like area. A row of discrete or incandescent light sources may be focussed to a line by means of a cylinder lens.

The imaging device and the sensor array are preferably integrated in a common housing of low cross section (similar to the Contact Image Sensor, CIS, known in the art). It may be possible to integrate more elements of the invention into an application specific module in order to reach a compact and modular technical construction.

The invention is preferably used for validating bank notes. Such device comprises typically a bank note transport path for sequentially feeding bank notes and an optical detection device arranged beneath the transport path and comprising an input aperture, an imaging device, a diffraction grating associated with the input aperture and a detection array. According to the invention the diffraction grating is rotated relative to the orientation of the linear detection array. The transport is effected by driven transport rolls and mechanical guide elements that force the bank note along a predetermined path passing by the optical detection device. The optical detection device of the invention has a very small cross-section and can therefore be easily integrated in any type of validation apparatuses.

Generally speaking, the optical sensor device is based on the a method for the spectral analysis of an area of detection of an object, comprising the steps of:

a) limiting the area of detection by at least one input aperture, b) imposing a diffraction effect on the light limited by the at least one input aperture, c) detecting a first and/or higher order diffraction effect by means of a linear detection array d) imposing a rotation relative to the orientation of the linear detection array on the diffraction effect.

BRIEF DESCRIPTION OF THE DRAWING

The invention is now described in more detail in connection with a preferred embodiment with reference to FIG. 1 which is a schematic perspective view of a spectrometer.

DETAILED DESCRIPTION OF EMBODIMENTS

Figure 1:
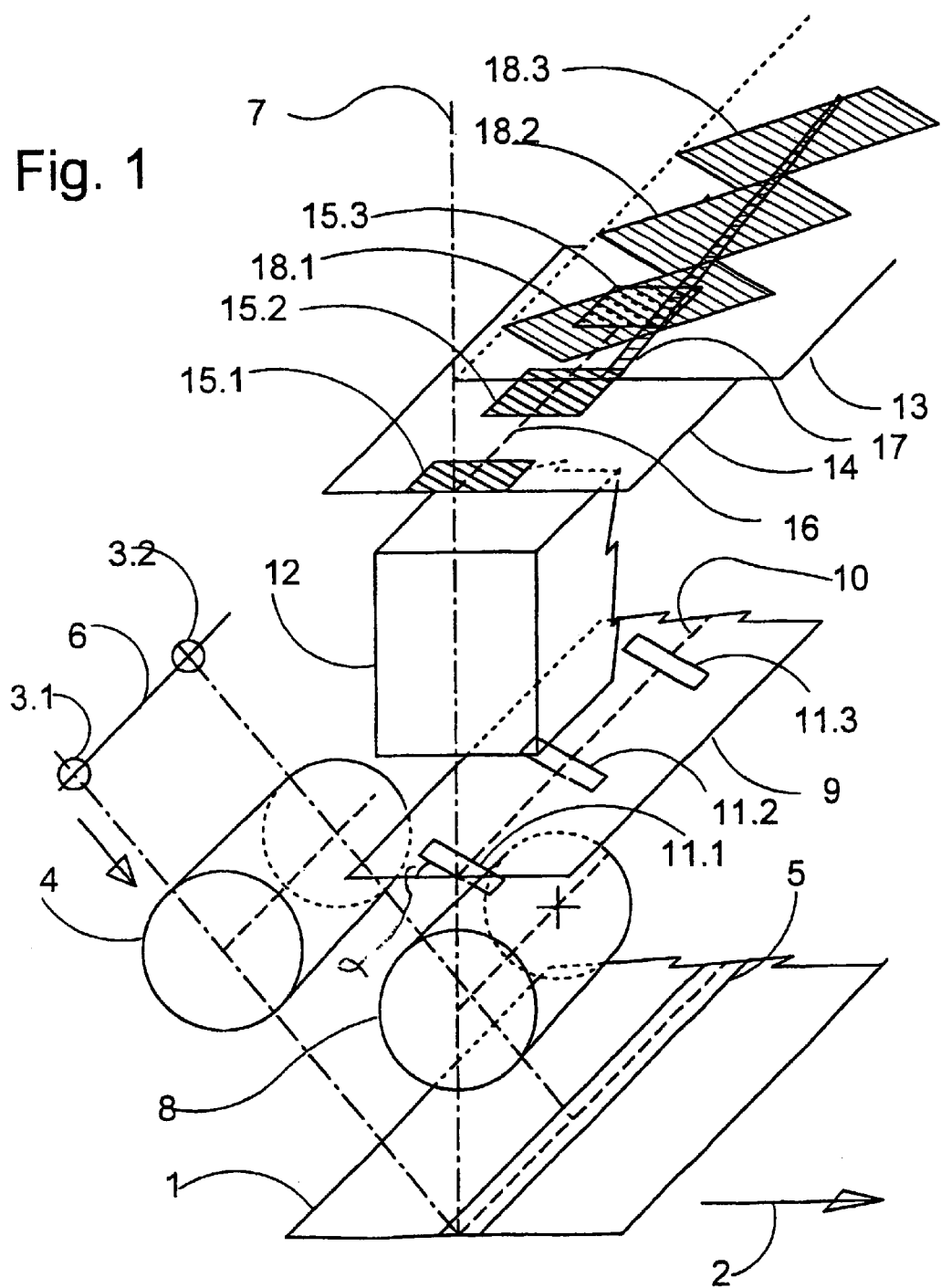

FIG. 1 shows a preferred embodiment of the invention. The spectrometer of this type may be used in a bank note processing device (see e.g. EP 0 645 742 B). Such devices usually have a transport mechanism for feeding the bank notes 1 in a sequence and at an elevated transport speed from a bank note input to a bank note output. The orientation of the bank note 1 during the transport may be transverse to the direction of the feed path 2. The spectrometer, which is combined with a data analyzing device (e.g. a microprocessor, a digital signal processor or a computer) to enable validating the bank note, preferably covers the full width of the feed path so that the bank note can be scanned completely when passing by the sensor device. The decision on whether the bank note is valid or not may of course not only be based on a spectral analysis but also on additional detections such as a capacity detection. Such additional detection schemes are well known in the art.

An illuminator comprises a plurality of light sources 3.1, 3.2 and a cylinder lens 4 to illuminate a long and narrow detection line 5. The cylinder lens 4 is parallel to the detection line 5. The light sources 3.1, 3.2 may be incandescent elements that are arranged on a straight line 6 at an appropriate distance from each other to ensure that the intensity of illumination along the line 5 is more or less constant and sufficiently high for the detection.

The light reflected by the surface of the bank note 1 in the direction of the optical axis 7 is focussed by the cylinder lens 8 onto a mask 9. The mask 9 is in a plane perpendicular to the optical axis 7 and extends in a direction parallel to the detection line 5. A plurality of slit-type apertures 11.1, 11.2, 11.3 are arranged along the axis 10 of the mask. Each aperture 11.1, 11.2, 11.3 defines an area or "point" on the detection line 5 that is spectrally analyzed. According to a preferred embodiment of the invention, the apertures 11.1, 11.2, 11.3 have a length in the range of 1 mm to 2 mm (e.g. s=1.4 mm) and a width in the range of $\frac{1}{10}$ to $\frac{3}{10}$ mm (e.g. of w=0.2 mm). The apertures 11.1, 11.2, 11.3 all have the same orientation, they are rotated at an angle $\alpha$ with respect to the axis 10 of the mask. The slits are therefore neither parallel nor orthogonal to the axis 10. The most preferred angle is $\alpha=45°$. The apertures 11.1, 11.2, 11.3 may have a pitch in the range of 1 mm to 5 mm depending on the object to be analyzed and on the desired spectral resolution. There are obviously several parameters that may be adapted and that have to be considered when defining the pitch of the apertures.

Behind (in FIG. 1: "above") the mask 9 there is an imaging device 12, e.g. a selfoc lens array (S LA), that projects an image of the mask 9 into the plane 13 of the optical sensor. It is preferred that the imaging device 12 does not generate inverted images. However, inverted images may be tolerated as well when anti aliasing means are present.

A diffraction grating arrangement 14 is interposed between the plane 13 of the optical sensor and the imaging device 12. As shown in the present example the diffraction grating arrangement 14 comprises a plurality of transmission gratings 15.1, 15.2, 15.3. Each transmission grating 15.1, 15.2, 15.3 is associated with an aperture 11.1,11.2,11.3. The transmission gratings 15.1, 15.2, 15.3 have an orientation that is rotated with respect to the axis of the diffraction grating arrangement 14 at the same angle as the apertures 11.1, 11.2, 11.3 are with respect to the axis 10. This angle is preferably 45°. The transmission grating 15.1 and the associated aperture 11.1 are on the same optical axis. The transmission gratings 15.1, 15.2, 15.3 may form a contiguous, stripe-like area or a series of separated rectangular areas. Each rectangular area may or may not be rotated with respect to the axis 16. It is sufficient if the light of the apertures 11.1, 11.2, 11.3 is more or less completely captured by the diffraction effect and if the grating structure itself is rotated at the desired angle.

The line 5, the cylinder lens 8, the axis 10 of the mask, the imaging device 12 and the transmission gratings 15.1, 15.2, 15.3 all are in parallel and are additionally aligned on the optical axis 7. The sensor array 17 however is displaced laterally with respect to the optical axis 7 in such a way that the first order diffractions 18.1, 18.2, 18.3 of the transmission gratings 15.1, 15.2, 15.3 can be detected. (The zero order diffractions which are projected more or less along the optical axis 7 onto the plane 13 are not shown in FIG. 1. Additionally, it is to be noted that while there are symmetrical first order diffractions on the "positive" and the "negative" side of the zero order diffractions, FIG. 1 only shows the "positive" first order diffractions 18.1, 18.2, 18.3.)

Because the orientation or lines of the diffraction grating is rotated at an angle of 45°, the first order diffractions 18.1, 18.2, 18.3, each of which basically covers an elongate rectangular area in the plane 13, are rotated at the same angle with respect to the line of detection. In addition, they are abutting to each other and form a contiguous area having a "stepped" shape. The sensor array 17 is placed in such a way that it is completely within the contiguous "stepped" area. According to FIG. 1 it is parallel to the line of detection but shifted by a certain distance from the optical axis 7.

As illustrated in FIG. 1, the sensor array 17 intersects the first order diffractions asymmetrically. This leads to a selection of the detected wave lengths. In fact, each first order diffraction 18.1, 18.2, 18.3 contains the full spectral information in the pattern. It is therefore most preferred to have the sensor array 17 intersect the first order diffractions 18.1, 18.2, 18.3 starting from the position of the longest wave length within the range of the sensor and ending e.g. close to the outer end of the pattern depending on the shortest wave length that may be detected by the sensor.

The extension of the first order diffractions 18.1, 18.2, 18.3 depend on the pitch of the grating. Good results have been accomplished with a pitch corresponding to 300 to 600 lines per millimeter. (e.g. d=0.0017 mm). In order to have sufficient light in the first order diffraction, a blaze grating is used which concentrates the light power in a preferred and predetermined diffraction order.

The sensor array 17 has a single array of pixels which capture different spectral components of the diffracted light depending on the position of the pixel and the geometric design of the grating. According to a preferred embodiment the sensor array 17 and the optical components are built into a rod-like housing to get a construction comparable to a CIS (Contact Image Sensor) module. CIS modules are readily available on the market and used for scanning documents in fax machines and in counterfeit currency detection devices (see e.g. U.S. Pat. No. 5,607,040, EP 0 935 223). They include an array of optical and photosensitive means for detecting the pattern of a printed document e.g. in the visible range.

The digital signal generated by the sensor array 17 is processed in any desired way by a computer or e.g. a DSP or ASIC (see e.g. EP 0 947 964 A).

The invention is not limited to the embodiments described above. There are many variations which are within the scope of the invention as may be evident from the following explanations.

There may be two illuminators, one on each side of the sensor device. The illumination areas may fully or partly overlap. The two illuminators may have different spectra. The spectra may be complementary such that the illumination covers a broad spectral range (e.g. from the UV- to the IR-range). An illumination in the UV-range may be used to detect the fluorescent "finger print" of the bank note.

The construction of the illumination means depends on the size and shape of the detection zone. While FIG. 1 shows a narrow straight line it is also possible to have a curved line or several separated lines. It is also possible to analyze a circular, oval or rectangular area by using a fiber bundle. At the input end the fibers are distributed evenly on the area to be analyzed and on the output end they may be arranged on a single line in front of the input aperture. The area on the object is therefore mapped to a linear array. In other words: The fiber bundle maps each input aperture to a distinct point or region of an external object where these points or objects can be arranged arbitrarily.

The cylinder lenses 4 and 8 may be replaced by other optical devices that project the light onto the surface of the object and that collect the reflected radiation for the spectral analysis.

Even though it is preferable that the apertures in the mask and the diffraction grating are dimensioned in such a way that a contiguous area of rotated diffraction patterns is generated, it is still possible to have spatially separated patterns. The invention can even be used with one single aperture and one corresponding diffraction grating. In any case the invention refers to arrangements where the line of detection and the spatial direction of diffraction are at a suitable angle in between 0° and 90°. It is not essential that all apertures and associated gratings have the same relative orientation. It is conceivable that the angle changes from one aperture/grating pair to another aperture/grating pair.

The apertures don't have to be slits. They may also have the shape of circles or squares. However, a shape with an extended length is preferred. Even though it is preferred that all apertures have the same size, shape and orientation, it is not out of the scope of the invention to have varying sizes, shapes and orientation. Also the distance between neighboring apertures can vary.

The invention is not limited to one linear detection array. Using two arrays (e.g. side by side) may improve the detection and even the resolution (depending on the angle of rotation and the geometry of the sensor array).

In summary the invention provides a spectral detection device that can be implemented in a compact way. It has a wide field of application beyond currency validation.

The invention claimed is:

1. Optical detection device for spectroscopic measurements comprising several input apertures, an imaging device, several diffraction gratings, each grating being associated with a corresponding input aperture and a linear detection array, wherein the grating lines of the diffraction gratings extend at an acute angle relative to the longitudinal axis of the linear detection array, and wherein the diffraction gratings cause spectra from each input aperture to impinge on different portions of the linear detection array.

2. Optical detection device according to claim 1, wherein the first order diffractions of the diffraction gratings abut one another on the linear detection array.

3. Optical detection device according to claim 1, wherein the acute angle is substantially 45°.

4. Optical detection device according to claim 1, wherein the detection array has a single linear array of light sensitive detection pixels and wherein an axis of the linear array is offset with respect to an optical axis of the optical detection device.

5. Optical detection device according to claim 1, wherein the diffraction grating has a preferential direction maximizing power diffraction into an order intercepted by the linear detection array.

6. Optical detection device according to claim 1, wherein the imaging device is a lens array.

7. Optical detection device according to claim 1, wherein an optical anti-aliasing means is arranged in front of the input apertures to provide anti-aliasing in at least one direction.

8. Optical detection device according to claim 1, wherein illumination means is arranged to provide a stripe-like illuminated area on an object to be analyzed.

9. Optical detection device according to claim 8, wherein the illumination means has a continuous broad band spectrum in the visible and/or the infrared range.

10. Optical detection device according to claim 8, wherein the illumination means comprises a multiplicity of sources and an imaging device for projecting the light of the sources to a stripe-like illumination area.

11. Optical detection device according to claim 1, wherein a fiber bundle maps areas of an object on the input apertures.

12. Device for validating bank notes comprising;
   a) a bank note transport path for sequentially feeding bank notes; and
   b) an optical detection device according to claim 1.

13. Optical detection device according to claim 6, wherein the lens array is a GRIN lens array.

14. Optical detection device according to claim 7, wherein the optical anti-aliasing means is a cylinder lens.

15. Optical detection device according to claim 7, wherein the at least one direction is a direction parallel to the detection array.

16. Optical detection device according to claim 10, wherein the imaging device for projecting the light of the sources is a cylinder lens.

17. Method for the spectral analysis of an area of detection of an object, comprising:
   a) limiting the area of detection by at least one input aperture;
   b) further limiting the area of detection by:
      1) associating a diffraction grating to each input aperture of the at least one input aperture; and
      2) selecting an angle of rotation, a pitch of each input aperture and a pitch of the associated diffraction grating in such a way that the spectra of multiple points in the area of detection are contiguously mapped onto a linear detection array, enabling the spectra of multiple points to be measured simultaneously;
   c) imposing a diffraction effect on the light limited by the at least one input aperture; and
   d) detecting a first and/or higher order diffraction effect by means of the linear detection array,
   wherein a rotation relative to the orientation of the linear detection array is imposed on the diffraction effect.

* * * * *